No. 837,654. PATENTED DEC. 4, 1906.
A. I. APPLETON.
FINISHING OR GUARD RING FOR ELECTRIC CONDUITS.
APPLICATION FILED JUNE 26, 1905.

Witnesses
G. A. Lauberschmidt
George L. Chindahl.

Inventor
Albert I. Appleton
By Luther L. Miller
Atty

UNITED STATES PATENT OFFICE.

ALBERT I. APPLETON, OF CHICAGO, ILLINOIS.

FINISHING OR GUARD RING FOR ELECTRIC CONDUITS.

No. 837,654.　　　　Specification of Letters Patent.　　　　Patented Dec. 4, 1906.

Application filed June 26, 1905. Serial No. 267,035.

*To all whom it may concern:*

Be it known that I, ALBERT I. APPLETON, a citizen of the United States, residing at Chicago, in the county of Cook and State of Illinois, have invented certain new and useful Improvements in Finishing or Guard Rings for Electric Conduits, of which the following is a specification.

In installing insulated electrical wires and cables it is customary to inclose them at various points within pipes or conduits, and as the ends of these conduits frequently present sharp or rough edges it is necessary to protect the insulation upon the wires from the abrasion of said sharp edges.

It is the object of this invention, therefore, to provide an improved means for affording such protection to insulated wires where they enter or emerge from the conduit, thereby lessening the danger of grounding and short-circuiting the current traversing said wires.

Figure 1:
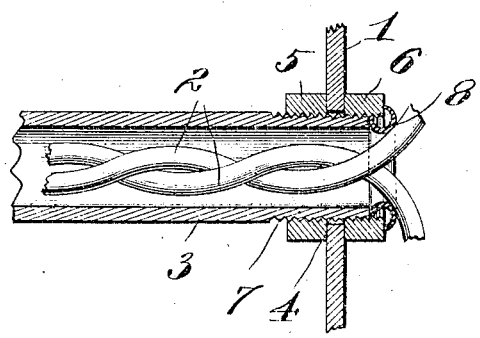
Figures 2, 3:
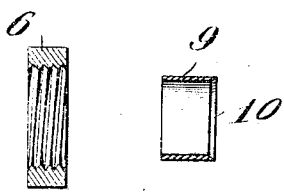

In the accompanying drawings, Figure 1 is a sectional view of a conduit with insulated wires therein, showing the finishing or guard ring of this invention upon the outer end of said conduit. Fig. 2 is a sectional view of a nut, and Fig. 3 a similar view of a short piece of tubing, which nut and tubing enter into the construction of said finishing or guard ring.

In the drawings, 1 refers to a portion of an inclosing casing—for instance, a switch-box—into which the insulated wires 2 are conducted through the pipe 3, one end of said pipe extending through an opening 4 in said switch-box. The pipe 3 is locked in position with relation to the box 1 by means of two nuts 5 and 6, turned upon screw-threads 7, formed upon the outer surface of the pipe 3 near the end thereof. The nut 5 lies upon the rear side of the box 1, while the nut 6 is turned upon the threads 7 in contact with the front side of said box. The guard-ring 8 for supporting the wires above the sharp edges at the end of the pipe 3 in this instance is formed from a short piece of tubing 9, Fig. 3, pressed into the outer end of the opening in the nut 6 in ring form, as will be hereinafter more fully described. This tubular piece 9 may be formed of brass or other ductile metal. The inner periphery of the tube is beveled at one end, as shown at 10, to facilitate its engagement with a die by means of which it is pressed into the nut 6. By means of suitable dies said tube is set within the opening in the nut 6 at the outer end of said nut and is given ring form, the inner diameter of the ring being somewhat less than the inner diameter of the tube 3. The ring is set firmly within the end of the nut 6, its inner side being seated securely within the screw-threads of said nut and its outer edge turned back against the face of the nut. The engagement of the ring 8 with the screw-threads of the nut is so secure that the ring is held rigidly in position upon the nut, while the outer side of the ring is forced tightly against the face of the nut and when finished appears to be integral with said nut.

I claim as my invention—

1. A finishing or guard ring for electric conduits comprising a nut threaded to have a screw-thread engagement with the end of the conduit, and an annular member engaging the screw-threads within said nut and secured to said nut by means of said engagement, said member providing a smooth rounded bearing-surface for an electric conductor.

2. A finishing or guard device for electric conduits comprising a nut threaded to have a screw-thread engagement with the end of the conduit, and a brass ring one edge of which engages the screw-threads within the central aperture of said nut, the other edge of said ring being bent over upon the outer end of said nut.

ALBERT I. APPLETON.

Witnesses:
　　L. L. MILLER,
　　GEORGE L. CHINDAHL.